(12) United States Patent
Pesach et al.

(10) Patent No.: US 8,908,277 B2
(45) Date of Patent: Dec. 9, 2014

(54) LENS ARRAY PROJECTOR

(75) Inventors: Benny Pesach, Rosh Haayin (IL);
Shimon Yalov, Nes Ziona (IL); Zafrir Mor, Ein Habsor (IL)

(73) Assignee: Apple Inc, Cupertino, CA (US)

( * ) Notice: Subject to any disclaimer, the term of this patent is extended or adjusted under 35 U.S.C. 154(b) by 149 days.

(21) Appl. No.: 13/567,099

(22) Filed: Aug. 6, 2012

(65) Prior Publication Data

US 2013/0038941 A1    Feb. 14, 2013

Related U.S. Application Data

(60) Provisional application No. 61/521,395, filed on Aug. 9, 2011.

(51) Int. Cl.
*G02B 27/10* (2006.01)
*G01B 11/25* (2006.01)
*G02B 27/09* (2006.01)
*G02B 19/00* (2006.01)

(52) U.S. Cl.
CPC ............ *G01B 11/25* (2013.01); *G02B 27/0961* (2013.01); *G02B 19/0057* (2013.01); *G02B 27/0905* (2013.01)
USPC ........................................................ 359/619

(58) Field of Classification Search
CPC ..................................................... G02B 3/005
USPC ....................................................... 359/619
See application file for complete search history.

(56) References Cited

U.S. PATENT DOCUMENTS

| | | |
|---|---|---|
| 3,796,498 A | 3/1974 | Post |
| 4,850,673 A | 7/1989 | Velzel et al. |
| 5,406,543 A | 4/1995 | Kobayashi et al. |
| 5,477,383 A | 12/1995 | Jain |
| 5,606,181 A | 2/1997 | Sakuma et al. |
| 5,648,951 A | 7/1997 | Kato et al. |
| 5,691,989 A | 11/1997 | Rakuljic et al. |
| 5,742,262 A | 4/1998 | Tabata et al. |
| 5,781,332 A | 7/1998 | Ogata |

(Continued)

FOREIGN PATENT DOCUMENTS

| | | |
|---|---|---|
| CN | 1725042 A | 1/2006 |
| JP | 2011118178 A | 6/2011 |

(Continued)

OTHER PUBLICATIONS

U.S. Appl. No. 13/567,095 Office Action dated Oct. 1, 2013.

(Continued)

*Primary Examiner* — James Jones
(74) *Attorney, Agent, or Firm* — D. Kligler I.P. Services Ltd.

(57) ABSTRACT

Optical apparatus includes a matrix of light sources arranged on a substrate with a predetermined, uniform spacing between the light sources. A beam homogenizer includes a first optical surface, including a first microlens array, which has a first pitch equal to the spacing between the light sources and which is aligned with the matrix so that a respective optical axis of each microlens in the array intercepts a corresponding light source in the matrix and transmits light emitted by the corresponding light source. A second optical surface, including a second microlens array, is positioned to receive and focus the light transmitted by the first microlens array and has a second pitch that is different from the first pitch.

29 Claims, 4 Drawing Sheets

(56) References Cited

U.S. PATENT DOCUMENTS

| | | | |
|---|---|---|---|
| 6,002,520 | A | 12/1999 | Hoch et al. |
| 6,031,611 | A | 2/2000 | Rosakis et al. |
| 6,560,019 | B2 | 5/2003 | Nakai |
| 6,583,873 | B1 | 6/2003 | Goncharov et al. |
| 6,611,000 | B2 | 8/2003 | Tamura et al. |
| 6,707,027 | B2 | 3/2004 | Liess et al. |
| 6,927,852 | B2 | 8/2005 | Reel |
| 6,940,583 | B2 | 9/2005 | Butt et al. |
| 7,112,774 | B2 | 9/2006 | Baer |
| 7,227,618 | B1 | 6/2007 | Bi |
| 7,304,735 | B2 | 12/2007 | Wang et al. |
| 7,335,898 | B2 | 2/2008 | Donders et al. |
| 7,700,904 | B2 | 4/2010 | Toyoda et al. |
| 7,952,781 | B2 | 5/2011 | Weiss et al. |
| 8,384,997 | B2 | 2/2013 | Shpunt et al. |
| 2004/0012958 | A1 | 1/2004 | Hashimoto et al. |
| 2004/0082112 | A1 | 4/2004 | Stephens |
| 2004/0156130 | A1* | 8/2004 | Powell et al. ............ 359/845 |
| 2005/0178950 | A1 | 8/2005 | Yoshida |
| 2006/0001055 | A1 | 1/2006 | Ueno et al. |
| 2006/0252167 | A1 | 11/2006 | Wang |
| 2006/0252169 | A1 | 11/2006 | Ashida |
| 2006/0269896 | A1 | 11/2006 | Liu et al. |
| 2007/0019909 | A1 | 1/2007 | Yamauchi et al. |
| 2008/0198355 | A1 | 8/2008 | Domenicali et al. |
| 2008/0212835 | A1 | 9/2008 | Tavor |
| 2008/0240502 | A1 | 10/2008 | Freedman et al. |
| 2008/0278572 | A1 | 11/2008 | Gharib et al. |
| 2009/0090937 | A1 | 4/2009 | Park |
| 2009/0096783 | A1 | 4/2009 | Shpunt et al. |
| 2009/0183125 | A1 | 7/2009 | Magal et al. |
| 2009/0185274 | A1 | 7/2009 | Shpunt |
| 2010/0007717 | A1 | 1/2010 | Spektor et al. |
| 2010/0013860 | A1 | 1/2010 | Mandella et al. |
| 2010/0142014 | A1 | 6/2010 | Rosen et al. |
| 2011/0019258 | A1 | 1/2011 | Levola |
| 2011/0069389 | A1 | 3/2011 | Shpunt |
| 2011/0075259 | A1 | 3/2011 | Shpunt |
| 2011/0114857 | A1 | 5/2011 | Akerman et al. |
| 2011/0187878 | A1 | 8/2011 | Mor et al. |
| 2011/0188054 | A1 | 8/2011 | Petronius et al. |
| 2011/0295331 | A1 | 12/2011 | Wells et al. |
| 2012/0038986 | A1 | 2/2012 | Pesach |
| 2012/0140094 | A1 | 6/2012 | Shpunt et al. |
| 2012/0140109 | A1 | 6/2012 | Shpunt et al. |
| 2013/0038881 | A1 | 2/2013 | Pesach et al. |
| 2013/0038941 | A1 | 2/2013 | Pesach et al. |

FOREIGN PATENT DOCUMENTS

| | | | |
|---|---|---|---|
| WO | 2007/043036 | A1 | 4/2007 |
| WO | 2007/105205 | A2 | 9/2007 |
| WO | 2008/120217 | A2 | 10/2008 |
| WO | 2010/004542 | A1 | 1/2010 |
| WO | 2012020380 | A1 | 2/2012 |
| WO | 2012066501 | A1 | 5/2012 |

OTHER PUBLICATIONS

U.S. Appl. No. 13/008,042 Office Action dated Dec. 3, 2013.
U.S. Appl. No. 12/330,766 Office Action dated Jul. 16, 2013.
International Application PCT/IB2013/051986 Search Report dated Jul. 30, 2013.
U.S. Appl. No. 13/008,042 Office Action dated Jul. 15, 2013.
Fienup, J.R., "Phase Retrieval Algorithms: A Comparison", Applied Optics, vol. 21, No. 15, Aug. 1, 1982.
International Application PCT/IL2008/01592 Search Report dated Apr. 3, 2009.
U.S. Appl. No. 12/840,312 Office Action dated Jul. 12, 2012.
Gerchberg et al., "A Practical Algorithm for the Determination of the Phase from Image and Diffraction Plane Pictures," Journal Optik, vol. 35, No. 2, pp. 237-246, year 1972.
Sazbon et al., "Qualitative Real-Time Range Extraction for Preplanned Scene Partitioning Using Laser Beam Coding," Pattern Recognition Letters 26, pp. 1772-1781, year 2005.
Moharam et al. "Rigorous coupled-wave analysis of planar-grating diffraction", Journal of the Optical Society of America, vol. 71, No. 6, pp. 818-818, Jul. 1981.
U.S. Appl. No. 12/945,908 Official Action dated Dec. 5, 2012.
Eisen et al., "Total internal reflection diffraction grating in conical mounting",Optical Communications 261, pp. 13-18, year 2006.
O'Shea et al., "Diffractive Optics: Design, Fabrication and Test", SPIE Tutorial Texts in Optical Engineering, vol. TT62, pp. 66-72, SPIE Press, USA 2004.
U.S. Appl. No. 13/008,042 Official Action dated Jan. 3, 2013.
U.S. Appl. No. 61/568,185, filed Dec. 8, 2011.
U.S. Appl. No. 12/330,766 Official Action dated Dec. 14, 2010.
Ezconn Czech A.S. "Site Presentation", Oct. 2009.
Luxtera Inc., "Luxtera Announces World's First 10GBit CMOS Photonics Platform", Carlsbad, USA, Mar. 28, 2005 (press release).
Bradley et al., "Synchronization and Rolling Shutter Compensation for Consumer Video Camera Arrays", IEEE International Workshop on Projector-Camera Systems—PROCAMS 2009, Miami Beach, Florida, 2009.
Marcia et al., "Fast Disambiguation of Superimposed Images for Increased Field of View", IEEE International Conference on Image Processing, San Diego, USA, Oct. 12-15, 2008.
U.S. Appl. No. 13/798,231, filed Mar. 13, 2013.
Btendo, "Two Uni-axial Scanning Mirrors Vs One Bi-axial Scanning Mirror", Kfar Saba, Israel, Aug. 13, 2008.
Microvision Inc., "Micro-Electro-Mechanical System (MEMS) Scanning Mirror", years 1996-2009.
European Patent Application # 11150668.9 Partial European Search Report dated Apr. 1, 2011.
U.S. Appl. No. 12/330,766 Official Action dated Jun. 7, 2011.
Garcia et al., "Three-dimensional mapping and range measurement by means of projected speckle patterns", Applied Optics, vol. 47, No. 16, pp. 3032-3040, Jun. 1, 2008.
Garcia et al.., "Projection of Speckle Patterns for 3D Sensing", Journal of Physics, Conference series 139, year 2008.
CN Patent Application # 200880119911.9 Office Action dated Jan 29, 2012.
U.S. Appl. No. 12/955,939 Office Action dated Jan. 30, 2012.
U.S. Appl. No. 12/955,940 Office Action dated Jan. 11, 2012.
U.S. Appl. No. 12/762,373 Office Action dated Mar. 7, 2012.
International Application PCT/IB2011/053560 Search Report dated Jan. 19, 2012.
U.S. Appl. No. 61/611,075, filed Mar. 15, 2012.
International Application PCT/IB2011/055155 Search Report dated Apr. 20, 2012.
U.S. Appl. No. 12/955,939 Office Action dated Jun. 1, 2012.
U.S. Appl. No. 12/955,940 Office Action dated Jun. 27, 2012.

* cited by examiner

LENS ARRAY PROJECTOR

CROSS-REFERENCE TO RELATED APPLICATION

This application claims the benefit of U.S. Provisional Patent Application 61/521,395, filed Aug. 9, 2011, which is incorporated herein by reference.

FIELD OF THE INVENTION

The present invention relates generally to optical devices and systems, and particularly to optical projection systems.

BACKGROUND

In an optical projection system, a beam of light illuminates a patterning element, and the pattern of light created by this element is cast onto a surface or volume in space. (The term "light" is used in the context of the present description and in the claims to refer to any sort of optical radiation, which may be in the visible, infrared and/or ultraviolet range.) The patterning element typically comprises a transparency through which the illuminating beam is transmitted, but in some cases it may comprise a reflective element. Projection systems are used in many applications, including three-dimensional (3D) mapping and imaging (also referred to as depth mapping) using structured or otherwise patterned light.

For example, U.S. Patent Application Publication 2010/0118123, whose disclosure is incorporated herein by reference, describes methods and systems for depth mapping using projected patterns. An illumination assembly includes a transparency containing a fixed pattern of spots. A light source transilluminates the transparency with optical radiation so as to project the pattern onto the object. An image capture assembly captures an image of the pattern that is projected onto the object. A processor processes the image captured by the image capture assembly so as to reconstruct a 3D map of the object.

In many illumination systems, it is desirable that the illuminating beam be as homogeneous as possible, with minimal variations in intensity over the field that is illuminated. Various means have been developed for beam homogenization. For example, U.S. Pat. No. 7,186,004 describes a homogenizing optical sheet, which accepts light transmitted at or within a specific entrance cone angle and then redirects and transmits the light within an exit cone that is substantially normal to the plane of the sheet. The intensity of the light within the exit cone is substantially uniform for any light source entering the sheet within the sheet's acceptance angle. The optical sheet is made of transparent material with microlens arrays formed on its opposite front and back surfaces. The thickness of the optical sheet is sufficient so that the microlenses on the opposite surfaces are separated a distance equal to the microlens focal length, with each microlens on the front and back surfaces having substantially similar size and shape, with centers transversely aligned.

SUMMARY

Embodiments of the present invention that are described hereinbelow provide optical projectors with improved illumination beam homogeneity.

There is therefore provided, in accordance with an embodiment of the present invention, optical apparatus, which includes a matrix of light sources arranged on a substrate with a predetermined, uniform spacing between the light sources. A beam homogenizer includes a first optical surface, including a first microlens array, which has a first pitch equal to the spacing between the light sources and which is aligned with the matrix so that a respective optical axis of each microlens in the array intercepts a corresponding light source in the matrix and transmits light emitted by the corresponding light source. A second optical surface includes a second microlens array, which is positioned to receive and focus the light transmitted by the first microlens array and which has a second pitch that is different from the first pitch.

Typically, the first and second optical surfaces are immediately adjacent to one another in the apparatus, without any intervening surface having optical power between the first and second optical surfaces. The first and second optical surfaces may respectively include front and rear surfaces of a single optical element.

In some embodiments, the first and second microlens arrays include microlenses arranged in different, respective first and second geometrical arrangements. In one embodiment, the first geometrical arrangement is hexagonal, and the second geometrical arrangement is rectangular.

Typically, the first microlens array is configured to collimate the light emitted by the light sources.

In some embodiments, the beam homogenizer includes a collection lens, which is configured to receive and collimate the light shaped by the second microlens array. The apparatus may also include a patterned element, which is configured to intercept and apply a predefined pattern to the collimated light from the collection lens, and a projection lens, which is configured to project the pattern of the light from the patterned element onto a surface. The patterned element may include a third microlens array, including microlenses arranged in a non-uniform pattern. In one embodiment, the apparatus includes an imaging assembly, which is configured to capture an image of the pattern on the surface and to process the image so as to derive a three-dimensional map of the surface.

There is also provided, in accordance with an embodiment of the present invention, optical apparatus, including a matrix of light sources arranged on a substrate with a predetermined, uniform spacing between the light sources. A beam homogenizer includes a first optical surface including a microlens array, which has a pitch equal to the spacing between the light sources and which is aligned with the matrix so that a respective optical axis of each microlens in the array intercepts a corresponding light source in the matrix and collimates light emitted by the corresponding light source. A second optical surface defines a diverging lens having a negative optical power, which is positioned to receive and transmit the light collimated by the microlens array. A collection lens is configured to receive and collimate the light transmitted by the second optical surface.

Typically, the first and second optical surfaces are immediately adjacent to one another in the apparatus, without any intervening surface having optical power between the first and second optical surfaces, and may respectively include front and rear surfaces of a single optical element.

In a disclosed embodiment, the diverging lens and the collection lens have a common focal plane.

There is additionally provided, in accordance with an embodiment of the present invention, an optical method, which includes providing a matrix of light sources arranged on a substrate with a predetermined, uniform spacing between the light sources. A first optical surface, including a first microlens array, which has a first pitch equal to the spacing between the light sources, is aligned with the matrix so that a respective optical axis of each microlens in the array intercepts a corresponding light source in the matrix and transmits light emitted by the corresponding light source. A second optical surface, including a second microlens array having a second pitch that is different from the first pitch, is positioned to receive and focus the light transmitted by the first microlens array so as to homogenize the light.

There is further provided, in accordance with an embodiment of the present invention, an optical method, which includes providing a matrix of light sources arranged on a substrate with a predetermined, uniform spacing between the light sources. A first optical surface, including a microlens array, which has a first pitch equal to the spacing between the light sources, is aligned with the matrix so that a respective optical axis of each microlens in the array intercepts a corresponding light source in the matrix and collimates light emitted by the corresponding light source. A second optical surface, defining a diverging lens having a negative optical power, is positioned to receive and transmit the light collimated by the microlens array. A collection lens is positioned to receive and collimate the light transmitted by the second optical surface.

The present invention will be more fully understood from the following detailed description of the embodiments thereof, taken together with the drawings in which:

DETAILED DESCRIPTION OF EMBODIMENTS

Overview

In many optical projection applications, it is important that the beam of light that is used in illuminating the patterning element be homogeneous, since variations in the illuminating beam can lead to deviations in the projected light pattern. Inhomogeneities in the illumination beam can appear as spurious intensity variations in the pattern that is projected. In laser-based projectors, laser speckle in particular can be a source of troublesome high-contrast inhomogeneity. In 3D mapping systems based on patterned light (such as the sort of system described in the above-mentioned U.S. Patent Application Publication 2010/0118123), speckle and other inhomogeneities can significantly degrade mapping accuracy.

Embodiments of the present invention that are described hereinbelow provide novel apparatus and methods for beam shaping and homogenization. These embodiments provide compact, inexpensive solutions for efficient generation of homogeneous projection beams. These solutions are described below with reference to pattern projection for 3D mapping, and they are particularly useful in this context. The principles of the disclosed embodiments, however, may similarly be applied in optical projection systems of other sorts.

In some embodiments, a beam homogenizer operates in conjunction with a matrix of light sources, such as an array of laser diodes, which are arranged on a substrate with a predetermined, uniform spacing between the light sources. The beam homogenizer comprises two optical surfaces, comprising respective microlens arrays with different, respective pitches. The first microlens array, on the optical surface facing the light sources, has a pitch equal to the spacing between the light sources. The microlenses are aligned with the matrix so that the optical axis of each microlens in the array intercepts a corresponding light source and transmits the light emitted by this light source. The second microlens array, on the other optical surface of the beam homogenizer, receives and focuses the light transmitted by the first microlens array. Typically, a collection lens then collimates the light focused by the second microlens array in order to generate the projection beam.

As a result of the different pitches, there is a mutual offset between the microlenses in the two arrays, which varies of the area of the beam homogenizer. The two arrays may be arranged in different, respective geometrical arrangements, such as one hexagonal array and one rectangular array. The offset between the arrays causes mixing of the light emitted from the different light sources over the area of the projected beam, and this mixing tends to average out the speckles generated by each individual light source and gives a combined beam of roughly uniform intensity. (Assuming the homogenizer mixes N light sources of roughly equal intensities, the speckle contrast will be reduced by approximately $1/\sqrt{N}$.) There is typically no intervening surface having optical power between the first and second optical surfaces (on which the respective microlens arrays are formed), and these two surfaces may conveniently be produced as the front and rear surfaces of a single optical element.

In other embodiments, the beam homogenizer, comprises a first optical surface comprising a microlens array, which is aligned with the matrix of light sources as described above and collimates the light emitted by the light sources. Instead of the second microlens array, however, the second optical surface defines a diverging lens having a negative optical power, which is positioned to receive and transmit the light collimated by the first microlens array. A collection lens, which typically shares a common focal plane with the diverging lens, collimates the light transmitted by the second optical surface. (The terms "collimate" and "collimated" are used in the present description and in the claims in the sense of rendering the rays in question approximately parallel, for instance to within about 5°, as would be understood by those skilled in the art, since perfect collimation can be achieved only with ideal point sources and optics.) This arrangement is advantageous in that the beam homogenizer can be made very compact by using a diverging lens with short focal length, i.e., with high divergence angle.

System Description

Figure 1:
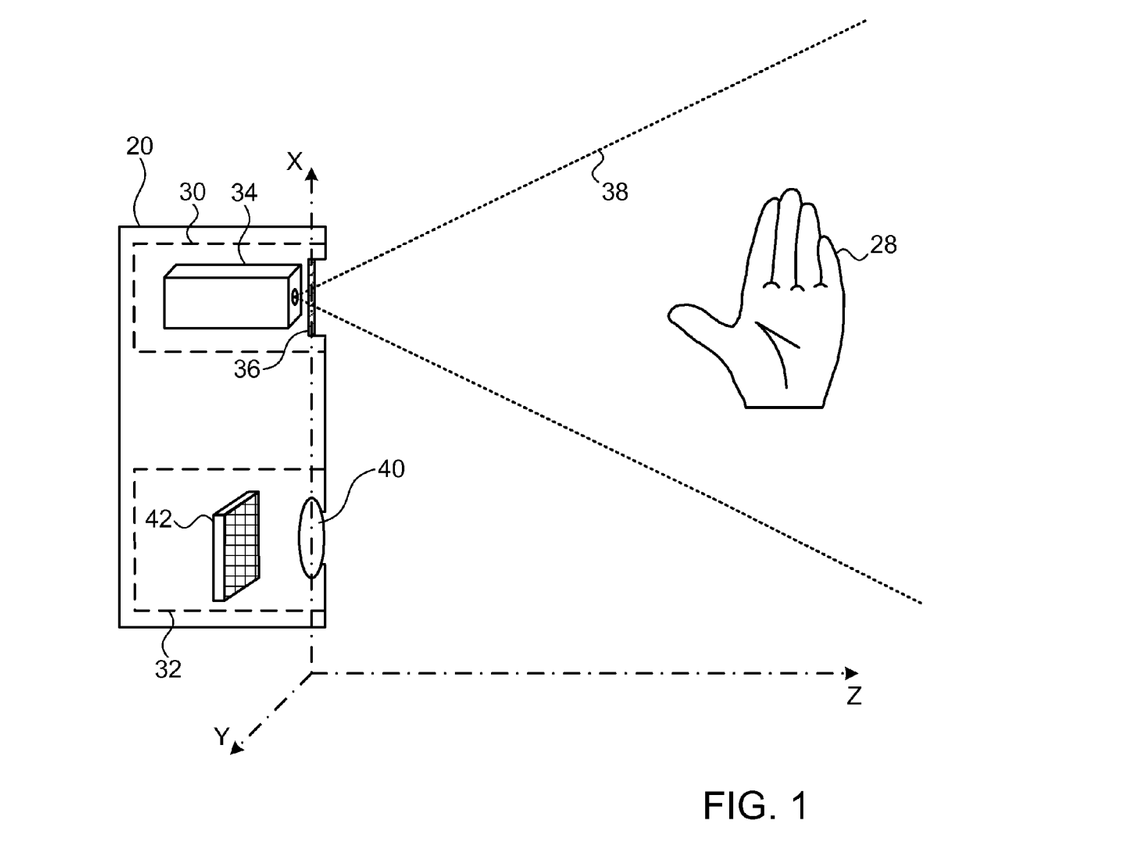
FIG. 1 is a schematic side view of a 3D mapping system, in accordance with an embodiment of the present invention.

FIG. 1 is a schematic side view of a 3D mapping system 20, in accordance with an embodiment of the present invention.

This system is described here as an example of the use of the sorts of beam homogenizers that are described below, and not by way of limitation. As noted earlier, the principles of the present invention may similarly be applied in other sorts of systems—and particularly optical projection systems—that require a homogeneous illumination beam and can benefit from the advantages of compactness and low cost that are offered by the disclosed embodiments.

System 20 comprises a projection assembly 30, which projects a patterned beam 38 onto the surface of an object 28—in this example the hand of a user of the system. An imaging assembly 32 captures an image of the projected pattern on the surface and processes the image so as to derive a three-dimensional map of the surface. For this purpose, assembly 32 typically comprises objective optics 40 and an image sensor 42, which captures the image. Details of the image capture and processing aspects of system 20 are described, for example, in the above-mentioned U.S. Patent Application Publication 2010/0118123, as well as in U.S. Patent Application Publication 2010/0007717, whose disclosure is incorporated herein by reference.

Projection assembly 30 comprises an optical pattern generator 34, which outputs a patterned illumination beam, and a projection lens 36, which projects the beam onto object 28. In the examples described below, the pattern comprises high-contrast light spots on a dark background, in a random or quasi-random arrangement, as described in the above-mentioned patent application publications. Alternatively, any other suitable type of pattern (including images) may be projected in this fashion.

Figure 2:
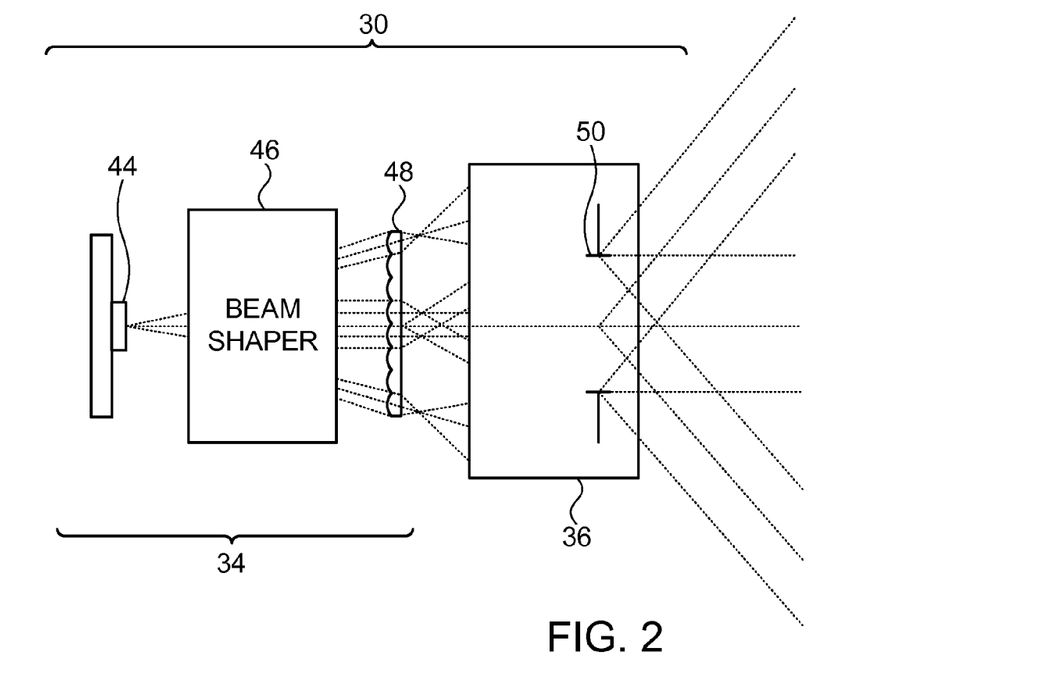
FIG. 2 is a schematic side view of an optical projection assembly, in accordance with an embodiment of the present invention.

FIG. 2 is a schematic side view of projection assembly 30, in accordance with an embodiment of the present invention. An emitter 44 emits light, which may be in the visible, infrared and/or ultraviolet range, as noted earlier. The emitter comprises a matrix of light sources arranged on a substrate, such as a semiconductor chip on which an array of vertical-cavity surface-emitting laser (VCSEL) diodes is formed. Alternatively, the emitter may comprise edge-emitting laser diodes with suitable optics for directing the emitted light away from the chip. Further alternatively, other sorts of suitable light sources may be used in emitter 44.

A beam shaper 46 homogenizes and focuses the light from emitter 44 to generate a homogeneous, wide-area beam. For projection applications, this beam may desirably be collimated. Possible designs of this beam shaper are described below.

The shaped beam passes through a patterning element 48, which applies a predefined pattern to the beam. Element 48 may comprise, for example, a non-uniform microlens array, wherein each microlens produces a respective spot in the pattern, as described in the above-mentioned U.S. Patent Application Publication 2010/0118123. Alternatively or additionally, element 48 may comprise any other suitable sort of optical element, such as a transparency imprinted with the desired pattern or a diffractive optical element (DOE), which diffracts the input beam to create the desired pattern.

Projection lens 36 projects the patterned light through an exit pupil 50 onto the object of interest.

Beam Homogenizer Using Dual Microlens Arrays

Figure 3:
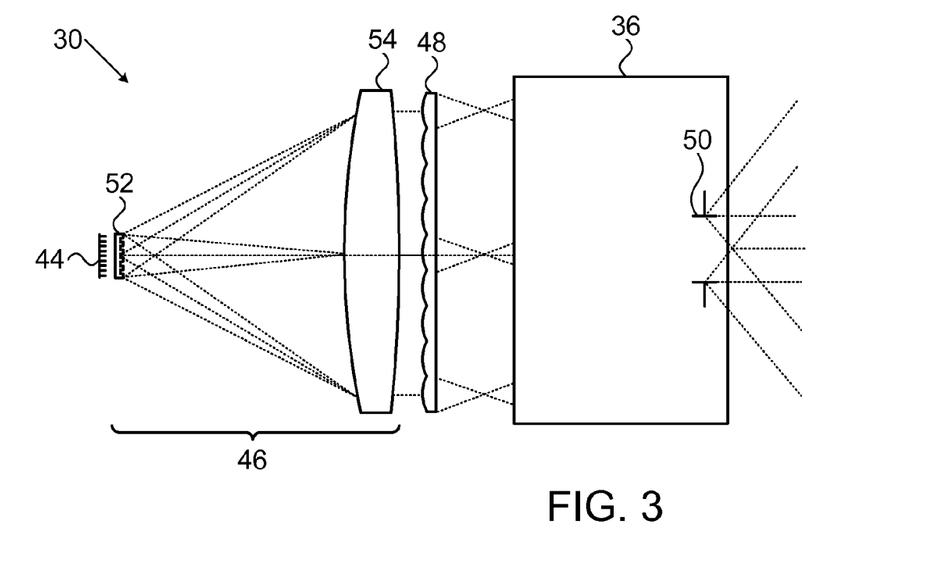
FIG. 3 is a schematic side view showing details of an optical projection assembly, in accordance with an embodiment of the present invention.

FIG. 3 is a schematic side of projection assembly 30, showing details of beam shaper 46, in accordance with an embodiment of the present invention. Emitter 44 comprises a matrix of VCSEL diodes arranged on a semiconductor substrate. A beam homogenizer 52, comprising a dual microlens array, homogenizes and focuses the beam from emitter 44, causing the beam to spread over the area of patterning element 48. A collection lens 54 receives and collimates the beam from homogenizer 52 through the patterning element. For compactness and optical efficiency, the collection lens may be placed close to the patterning element and may be designed to provide telecentric or quasi-telecentric illumination of the pattern that it contains. The resulting patterned light is then projected by projection lens 50.

Figure 4:
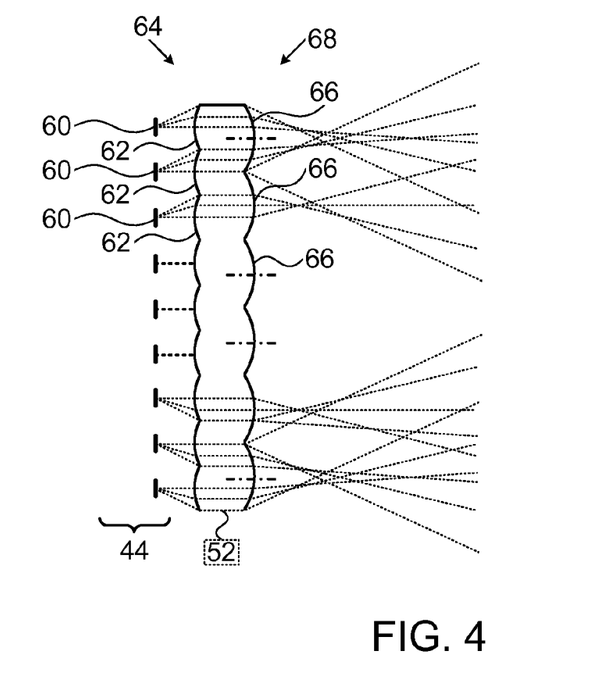
FIG. 4 is a schematic side view of an array of light sources with a beam homogenizer used in the projection assembly of FIG. 3, in accordance with an embodiment of the present invention.

FIG. 4 is a schematic side view of emitter 44 and beam homogenizer 52, in accordance with an embodiment of the present invention. The emitter, as noted above, comprises a matrix of light sources 60, which are implemented in this embodiment as VCSEL diodes. Although only a single row of light sources is shown in this side view, in practice the matrix of light sources is two-dimensional. Light sources 60 may be packed tightly on the substrate, with a center-to-center pitch of 25-50 µm, for example, in order to maximize the brightness of the emitter. Emitters of this sort are available commercially, for instance VCSEL array model PCW-CS3-6-WO808, made by Princeton Optronics (Princeton, N.J.).

Beam homogenizer 52 comprises an optical blank with a front optical surface 64 and a rear optical surface 68, with arrays of plano-convex microlenses 62, 66 formed on the respective surfaces. Array 52 may thus conveniently be formed as a single optical element, as shown in the figure. The element may be made from molded plastic or glass or molded polymer on glass. Typically the microlenses have an effective focal length in the range of 50-100 µm, and beam homogenizer 52 has an overall thickness in the range of 0.1-0.5 mm. Alternatively, the two component microlens arrays may be formed as separate optical elements (either plano-convex or in some other form), which are placed immediately adjacent to one another in beam shaper 46, without any intervening surface having optical power between their respective surfaces. The above structures and dimensions are presented by way of example, and other structures and dimensions implementing the principles of the present invention may alternatively be used depending on technology and system requirements, as will be apparent to those skilled in the art.

Microlenses 62 are aligned with the matrix of light sources 60, so that the optical axis of each microlens 62 intercepts a corresponding light source 60 in the matrix and collimates the light emitted by the corresponding light source. The array of microlenses 62 thus has the same pitch as the matrix of light sources 60, while microlenses 66, which receive and focus the collimated light transmitted by microlenses 62, have a significantly different pitch. Because of the short focal length of microlenses 66, the light transmitted through homogenizer 52 will spread to reach each location on patterning element 48 (FIG. 3) from multiple different light sources, over a range of different angles, thus ensuring high uniformity. It is also advantageous that the respective microlens arrays on surfaces 64 and 68 have different geometrical arrangements, as shown below.

Figure 5A:
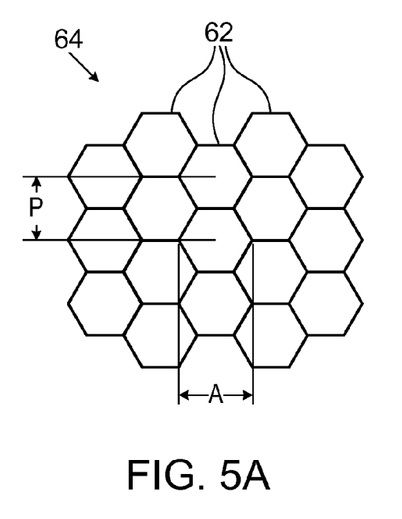
FIGS. 5A and 5B are schematic frontal views of microlens arrays used on opposing sides of a beam homogenizer, in accordance with an embodiment of the present invention.
Figure 5B:
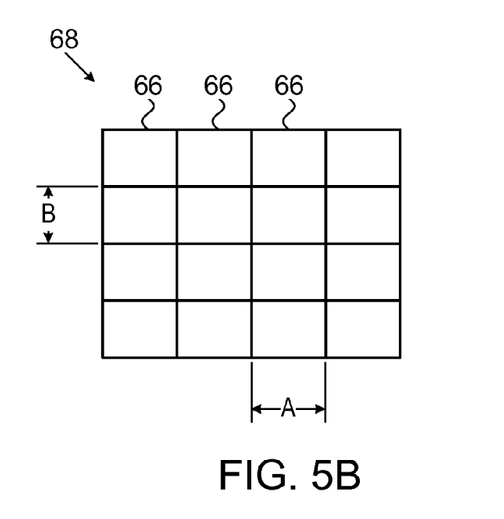
Figure 5C:
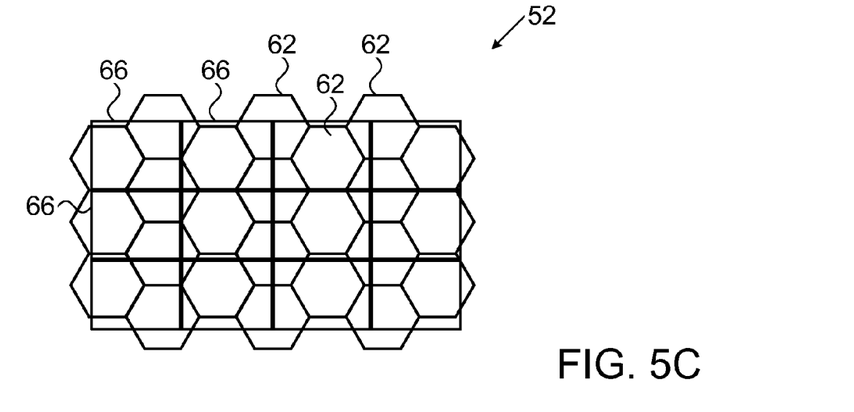
FIG. 5C is a schematic frontal view of a beam homogenizer comprising the microlens arrays of FIGS. 5A and 5B, in accordance with an embodiment of the present invention.

Reference is now made to FIGS. 5A-5C, which schematically show details of beam homogenizer 52, in accordance with an embodiment of the present invention. FIGS. 5A and 5B are schematic frontal views of surfaces 64 and 68, on opposing sides of homogenizer 52. FIG. 5C is a view through the beam homogenizer, showing the superposition of the microlens arrays of FIGS. 5A and 5B. Surface 64 in this example comprises a hexagonal array of microlenses 62, of width A and pitch P, which is designed to be equal to the pitch of the hexagonal matrix of light sources. Surface 68 comprises a rectangular array of microlenses 66, which may have different respective pitches A and B in the horizontal and vertical directions. The ratio A:B (which is roughly 4:3 in this example) may advantageously be set equal to the aspect ratio of the field to be illuminated by patterned beam 38 (FIG. 1). Although the same symbol A is used in FIGS. 5A and 5B to indicate the width of the hexagonal microlenses and the horizontal pitch of the rectangular microlenses, these two dimensions are generally different.

As shown in FIG. 5C, the arrays of microlenses 62 and 66 have different, respective pitches. Whereas the pitch of microlenses 62 is dictated by that of the matrix of light sources, the use of a different pitch for microlenses 66 enhances the homogenization of the light that is transmitted through homogenizer 52. For this purpose, it is desirable not only that the respective pitches P, A and B be different, but also their values be chosen so that $MP \neq N_A A$ and $MP \neq N_B B$ for any integer values of M and N up to the number of microlenses in each row or column of the corresponding array. Although the horizontal and vertical axes of the two arrays are shown in FIG. 5C as being aligned with one another, it may also be advantageous for good beam homogenization that these axes of the array on surface 68 be rotated relative to that on surface 64. In this latter case, the relationship between the respective pitches becomes less important.

In the pattern projected by assembly 30 in the embodiment described above, the minimum size of the projected spots depends on the divergence of the beam output by collection lens 54, which in turns depends on the distance between homogenizer 52 and the collection lens. Thus, to achieve smaller spot size, the overall length of beam shaper 46 must generally be increased. For applications in which assembly 30 is required to be very compact and at the same time generate a fine pattern, an alternative design may be desirable, as described below.

Beam Homogenizer Using a Microlens Array and a Diverging Lens

Figure 6:
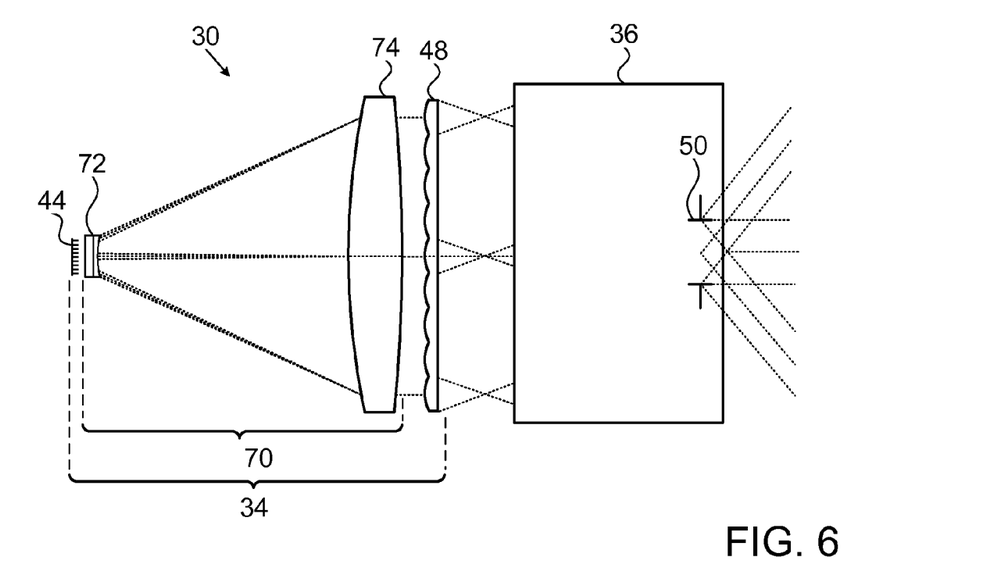
FIG. 6 is a schematic side view showing details of an optical projection assembly, in accordance with another embodiment of the present invention.

FIG. 6 is a schematic side of projection assembly 30, showing details of a beam shaper 70, in accordance with an alternative embodiment of the present invention. Beam shaper 70 comprises a beam homogenizer 72 and a collection lens 74, whose functions are similar to those in the preceding embodiment.

Figure 7:
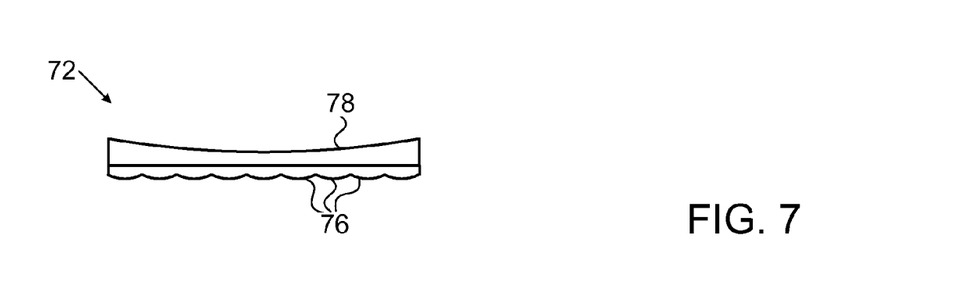
FIG. 7 is a schematic side view of a beam homogenizer used in the projection assembly of FIG. 6, in accordance with an embodiment of the present invention.

FIG. 7 is a schematic side view of homogenizer 72 (rotated 90° relative to the view in FIG. 6), in accordance with an embodiment of the present invention. The front surface of the homogenizer comprises an array of microlenses 76, which are constructed and aligned in a manner similar to microlenses 62 in the preceding embodiment: The pitch of the array is equal to the spacing between the light sources, and the optical axis of each microlens in the array intercepts a corresponding light source in the matrix and collimates the light that it emits. The rear surface of homogenizer 72, however, defines a diverging lens 78 having a negative optical power, which receives and transmits the light collimated by the microlens array. Homogenizer 72 is typically designed and aligned so that diverging lens 78 and collection lens 74 have a common focal plane (to the left of the homogenizer in FIG. 6).

As in the preceding embodiment, the array of microlenses 76 and diverging lens 78 may advantageously be produced as front and rear surfaces of a single optical element. Alternatively, the microlens array and diverging lens may be formed as separate elements, placed immediately adjacent to one another in beam shaper 70, without any intervening surface having optical power between them.

In the configuration shown in FIG. 6, beam shaper 70 can be made very compact by producing diverging lens 78 with very short focal length (and thus high optical power). It becomes more difficult in this configuration, however, to ensure mixing of the light from different sources in the matrix (and thus to suppress speckle contrast). It may therefore be desirable to position beam homogenizer 72 so that microlenses 76 are slightly defocused relative to the light sources, whereby the light transmitted by the microlenses to the diverging lens will be more divergent. This divergence will enhance mixing in the far field. Alternatively, a diffuser with controlled scattering angle may be positioned between the microlens array and the diverging lens.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Optical apparatus, comprising:
 a matrix of light sources arranged on a substrate with a predetermined, uniform spacing between the light sources; and
 a beam homogenizer, comprising a single optical element, which comprises:
  a front optical surface, comprising a first microlens array, which has a first pitch equal to the spacing between the light sources and which is aligned with the matrix so that a respective optical axis of each microlens in the array intercepts a corresponding light source in the matrix and transmits light emitted by the corresponding light source; and
  a rear optical surface, comprising a second microlens array, which is positioned to receive and focus the light transmitted by the first microlens array and which has a second pitch that is different from the first pitch.

2. The apparatus according to claim 1, wherein the first and second optical surfaces are immediately adjacent to one another in the apparatus, without any intervening surface having optical power between the first and second optical surfaces.

3. The apparatus according to claim 1, wherein the first and second microlens arrays comprise microlenses arranged in different, respective first and second geometrical arrangements.

4. The apparatus according to claim 3, wherein the first geometrical arrangement is hexagonal, and the second geometrical arrangement is rectangular.

5. The apparatus according to claim 1, wherein the first microlens array is configured to collimate the light emitted by the light sources.

6. The apparatus according to claim 1, wherein the beam homogenizer comprises a collection lens, which is configured to receive and collimate the light shaped by the second microlens array.

7. The apparatus according to claim 6, and comprising:
 a patterned element, which is configured to intercept and apply a predefined pattern to the collimated light from the collection lens; and
 a projection lens, which is configured to project the pattern of the light from the patterned element onto a surface.

8. The apparatus according to claim 7, wherein the patterned element comprises a third microlens array, comprising microlenses arranged in a non-uniform pattern.

9. The apparatus according to claim 7, and comprising an imaging assembly, which is configured to capture an image of the pattern on the surface and to process the image so as to derive a three-dimensional map of the surface.

10. Optical apparatus, comprising:
a matrix of light sources arranged on a substrate with a predetermined, uniform spacing between the light sources; and
a beam homogenizer, comprising:
a first optical surface comprising a microlens array, which has a pitch equal to the spacing between the light sources and which is aligned with the matrix so that a respective optical axis of each microlens in the array intercepts a corresponding light source in the matrix and collimates light emitted by the corresponding light source; and
a second optical surface defining a diverging lens having a negative optical power, which is positioned to receive and transmit the light collimated by the microlens array; and
a collection lens, which is configured to receive and collimate the light transmitted by the second optical surface.

11. The apparatus according to claim 10, wherein the first and second optical surfaces are immediately adjacent to one another in the apparatus, without any intervening surface having optical power between the first and second optical surfaces.

12. The apparatus according to claim 11, wherein the first and second optical surfaces respectively comprise front and rear surfaces of a single optical element.

13. The apparatus according to claim 10, wherein the diverging lens and the collection lens have a common focal plane.

14. The apparatus according to claim 10, and comprising:
a patterned element, which is configured to intercept and apply a predefined pattern to the collimated light from the collection lens; and
a projection lens, which is configured to project the pattern of the light from the patterned element onto a surface.

15. The apparatus according to claim 14, wherein the patterned element comprises a further microlens array, comprising microlenses arranged in a non-uniform pattern.

16. The apparatus according to claim 14, and comprising an imaging assembly, which is configured to capture an image of the pattern on the surface and to process the image so as to derive a three-dimensional map of the surface.

17. An optical method, comprising:
providing a matrix of light sources arranged on a substrate with a predetermined, uniform spacing between the light sources;
aligning a first optical surface, comprising a first microlens array, which has a first pitch equal to the spacing between the light sources, with the matrix so that a respective optical axis of each microlens in the array intercepts a corresponding light source in the matrix and transmits light emitted by the corresponding light source; and
positioning a second optical surface, comprising a second microlens array having a second pitch that is different from the first pitch, to receive and focus the light transmitted by the first microlens array so as to homogenize the light,
wherein the first and second optical surfaces respectively comprise front and rear surfaces of a single optical element.

18. The method according to claim 17, wherein the first and second optical surfaces are positioned immediately adjacent to one another, without any intervening surface having optical power between the first and second optical surfaces.

19. The method according to claim 17, wherein the first and second microlens arrays comprise microlenses arranged in different, respective first and second geometrical arrangements.

20. The method according to claim 19, wherein the first geometrical arrangement is hexagonal, and the second geometrical arrangement is rectangular.

21. The method according to claim 17, wherein aligning the first optical surface comprises configuring the first microlens array to collimate the light emitted by the light sources.

22. The method according to claim 17, and comprising positioning a collection lens to receive and collimate the light shaped by the second microlens array.

23. The method according to claim 22, and comprising:
applying a predefined pattern to the collimated light from the collection lens; and
projecting the pattern of the light from the patterned element onto a surface.

24. The method according to claim 23, wherein applying the pattern comprises passing the collimated light through a third microlens array, comprising microlenses arranged in a non-uniform pattern.

25. The method according to claim 23, and comprising capturing and processing an image of the pattern on the surface so as to derive a three-dimensional map of the surface.

26. An optical method, comprising:
providing a matrix of light sources arranged on a substrate with a predetermined, uniform spacing between the light sources;
aligning a first optical surface, comprising a microlens array, which has a first pitch equal to the spacing between the light sources, with the matrix so that a respective optical axis of each microlens in the array intercepts a corresponding light source in the matrix and collimates light emitted by the corresponding light source;
positioning a second optical surface, defining a diverging lens having a negative optical power, to receive and transmit the light collimated by the microlens array; and
positioning a collection lens to receive and collimate the light transmitted by the second optical surface.

27. The method according to claim 26, wherein the first and second optical surfaces are positioned immediately adjacent to one another in the method, without any intervening surface having optical power between the first and second optical surfaces.

28. The method according to claim 26, wherein the diverging lens and the collection lens are positioned so as to have a common focal plane.

29. The method according to claim 26, and comprising:
applying a predefined pattern to the collimated light from the collection lens; and
projecting the pattern of the light from the patterned element onto a surface.

* * * * *

UNITED STATES PATENT AND TRADEMARK OFFICE
CERTIFICATE OF CORRECTION

| | | |
|---|---|---|
| PATENT NO. | : 8,908,277 B2 | Page 1 of 1 |
| APPLICATION NO. | : 13/567099 | |
| DATED | : December 9, 2014 | |
| INVENTOR(S) | : Benny Pesach et al. | |

It is certified that error appears in the above-identified patent and that said Letters Patent is hereby corrected as shown below:

On the title page item (73), Assignee name should be APPLE INC.

Signed and Sealed this
Thirty-first Day of May, 2016

Michelle K. Lee
*Director of the United States Patent and Trademark Office*